United States Patent
Dopico et al.

(12)

(10) Patent No.: US 6,342,303 B1
(45) Date of Patent: Jan. 29, 2002

(54) EPOXY-FUNCTIONAL POLYSILOXANE MODIFIED PHENOLIC RESIN COMPOSITIONS AND COMPOSITES

(75) Inventors: Pablo G. Dopico, Conyers; Shahid P. Qureshi, Duluth; Ellen V. Nagy, Covington, all of GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 09/511,350

(22) Filed: Feb. 23, 2000

(51) Int. Cl.$^7$ .................................................. B32B 9/04
(52) U.S. Cl. ........................ 428/447; 428/524; 428/531; 525/476; 525/481
(58) Field of Search ................................ 525/481, 476; 428/447, 524, 531

(56) References Cited

U.S. PATENT DOCUMENTS

| | | |
|---|---|---|
| 2,755,269 A | 7/1956 | Moorhead |
| 3,074,903 A | 1/1963 | Fincke et al. |
| 4,022,753 A | 5/1977 | Lohse et al. |
| 4,720,515 A * | 1/1988 | Iji et al. ...................... 525/476 |
| 4,853,434 A | 8/1989 | Block .......................... 525/100 |
| 5,108,824 A | 4/1992 | Wang et al. |
| 5,319,005 A | 6/1994 | Hagiwara et al. ............ 523/435 |
| 5,530,063 A | 6/1996 | Nagai et al. ................. 525/101 |
| 5,736,619 A | 4/1998 | Kane et al. |
| 5,864,000 A | 1/1999 | Lightbody et al. ............. 528/29 |
| 6,180,695 B1 * | 1/2001 | Ito et al. ...................... 523/431 |

FOREIGN PATENT DOCUMENTS

EP 0 428 871 A2 5/1991

OTHER PUBLICATIONS

Abstract JP 09012995 Jan. 1997.*

* cited by examiner

Primary Examiner—Margaret G. Moore
(74) Attorney, Agent, or Firm—Banner & Witcoff, Ltd.

(57) ABSTRACT

The preparation of composites using epoxy-functional silicones as additives to phenolic resole resins.

14 Claims, No Drawings

EPOXY-FUNCTIONAL POLYSILOXANE MODIFIED PHENOLIC RESIN COMPOSITIONS AND COMPOSITES

FIELD OF THE INVENTION

The preparation of epoxy-functional polysiloxane modified phenolic resole resins and use thereof in composites.

BACKGROUND OF THE INVENTION

U.S. Pat. No. 5,864,000 to Lightbody is directed to hybrid phenolic/polysiloxane resins derived from (A) reacting a phenolic compound with (a) a siloxane polymer or (b) and aldehyde and (B) reacting the reaction product of(A)(a) with an aldehyde, or (A)(b) with a siloxane polymer to form the hybrid phenolic/polysiloxane resin. The siloxane polymer is defined as compounds having —Si—O—Si— groups in their structure. Suitable siloxane polymers were described as alkoxy and/or silanol functional siloxane polymers having a molecular weight of 1000 to 6000.

U.S. Pat. No. 5,319,005 to Hagiwara et al. relates to epoxy resin molding materials used for sealing electronic components such as transistors and integrated circuits. The composition comprises an epoxy resin having at least two epoxy groups per molecule and a phenolic compound having at least two phenolic hydroxyl groups per molecule such as phenol-formaldehyde resin condensates. To the epoxy resin containing phenolic compound are added a vinyl group-containing organopolysiloxane and a ≡SiH group-containing organopolysiloxane as well as inorganic filler. The two types of organopolysiloxanes are permitted to react with one another to effect curing of the epoxy resin. The polysiloxanes form a particulate which is dispersed throughout the resin.

U.S. Pat. No. 4,853,434 to Block teaches a modified thermosetting resin comprising a reaction resin or reaction resin mixture and one or more three-dimensional crosslinked polyorganosiloxane rubbers. Suitable reaction resins include epoxy resins and condensation products of aldehydes, including formaldehyde, with aliphatic and aromatic compounds containing amine groups including urea or melamine as well as aromatic compounds such as phenol, resorcinol, xylene and the like. The compositions are prepared by dispersing polyorganosiloxane rubber particles in the thermosetting resin or mixture of thermosetting resins in the presence of a crosslinking catalyst at temperatures of from 18 to 120° C.

U.S. Pat. No. 4,022,753 to Lohse et al. discloses the reaction products of a polysiloxane and polyphenols such as resorcinol, bisphenol A etc. (novolac resins) The resulting product is utilized as a curing agent or modifying agent for epoxy resins.

U.S. Pat. No. 5,530,063 to Nagai et al. shows organopolysiloxane compositions which are room temperature-curable and which comprise an organopolysiloxane, a polymer of a monomer having an ethylenically unsaturated double bond and an epoxy compound. Suitable curing agents and catalysts are also present in the formulation.

It is desirable to improve the toughness of phenolic resins without decreasing fire-resistance properties of composites.

SUMMARY OF THE INVENTION

Phenolic resole resins are modified with epoxy-functional polysiloxane by one of these methods: (1) reacting phenol with the epoxy-functional polysiloxane as the first step of preparation of the phenolic resole; (2) adding the epoxy-functional polysiloxane to the phenolic resole after the phenolic resole has been prepared (i.e. a blend procedure) or (3) reacting the epoxy-functional polysiloxane with resorcinol, bisphenol-A, or bisphenol-F, and then blending this phenolic functionalized silicone with a resole or reacting it with formaldehyde to make a resole.

DETAILED DESCRIPTION OF THE INVENTION

Phenolic resole resin compositions are modified with epoxy-functional polysiloxanes. The compositions may be produced by several methods including (1) reacting epoxy-functional polysiloxane with phenol and then reacting the polysiloxane grafted phenol with formaldehyde to form a phenolic resole resin; (2) blending a pre-existing phenolic resin with the epoxy-functional polysiloxane and permitting the grafting reaction to proceed coincident with the curing/hardening of the phenolic resin and (3) reacting an epoxy-functional polysiloxane with a polyhydroxy phenolic monomer, such as resorcinol or a bisphenol, and either combining the reacted material with a pre-existing phenolic resin for curing/hardening or further treating the reacted material with formaldehyde or phenol and formaldehyde to make a silicon-modified phenolic resin.

The resulting compositions may be used to impregnate a variety of substrates, such as, but not limited to paper, glass roving or mat, carbon fiber, aramid fibers, kevlar, and nomex honeycomb.

Different types of epoxy-functional polysiloxanes may be used. The preferred epoxy-functional polysiloxane (epoxy silicone) is depicted by the right-hand formula below. The left-hand formula provides a shorthand definition. However, these formulas are illustrative only. The epoxy-functional polysiloxane may be any suitable epoxy-functional polysiloxane that provides the desired epoxy-functional polysiloxane-modified phenolic resin.

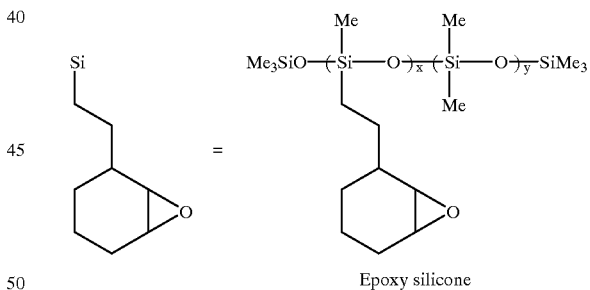

Epoxy silicone

The terms epoxy-functional polysiloxane and epoxy-functional silicone may be used interchangeably. In the definition of epoxy-functional polysiloxane, x is 1 to 100 and y is 0 to 10,000, and the ratio of x:y is typically from 1:0.5 to 1:100, preferably 1:1 to 1:10, and most preferably 1:1 to 1:5. One epoxy-functional polysiloxane available commercially is silicone Y-12940 from OSI Witco.

As stated above, any suitable epoxy-functional polysiloxane may be used. The polysiloxane may include branching points, and the epoxy-functional repeat units need not be adjacent to one another. Thus, the copolymer may be a random, alternating, or block copolymer. Other epoxy-functional polysiloxanes include, but are not limited to, the following epoxy-functional polysiloxane, where x is 0 to 1000, preferably 0 to 100, and most preferably 5 to 30.

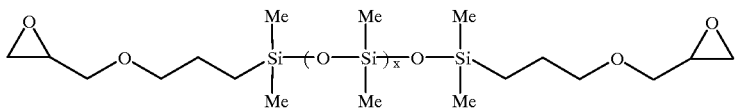

This polysiloxane is available commercially as OSI Witco Silicone Y-14362.

The epoxy-functional polysiloxane-modified phenolic resin may be made by several different procedures identified below as procedures #1, #2, and #3.

Procedure #1

First, phenol is reacted with the epoxy-functional polysiloxane to open the epoxy ring and form a C—O—C ether linkage between the phenol and the silicone molecule. Then, formaldehyde is added to form a phenolic resole resin with excess phenol and with epoxy-functional polysilxane-modified phenol.

More specifically, an epoxy-functional polysiloxane is mixed with excess phenol and a basic catalyst, such as sodium hydroxide, and heated to between about 120° C. and about 180° C., preferably about 140° C., for between about 30 minutes and about 90 minutes. Subsequently, the reaction mixture is cooled to between about 45° C. and about 75° C., preferably about 55° C., and formaldehyde is added. The reaction mixture is then heated to between about 65° C. and about 90° C., preferably about 75° C., and held at that temperature until a desired free formaldehyde is achieved. Suitable free formaldehyde levels are generally between about 0.5 wt % and about 4 wt %.

Generally, the weight range of epoxy-functional polysiloxane to phenol is from about 100:0.1 to about 0.1:100, and the preferred range is about 5:100 to about 15:100. However, both ranges will be affected by the epoxy equivalent weight of the epoxy-functional polysiloxane.

The weight range of catalyst to phenol in the first step of the process is about 0.01 to about 10 parts of catalyst per 100 parts of phenol, preferably about 0.1 to about 2.5 parts of catalyst per 100 parts of phenol.

The mole ratio of formaldehyde to phenol is about 0.8:1 to about 3:1, preferably about 1.2:1 to about 1.9:1. A suitable catalyst, such as sodium hydroxide, may be added during the addition of the formaldehyde to promote the reaction between the phenol and formaldehyde.

The reaction scheme is illustrated below.

1. Reaction of phenol with epoxy silicone to open the epoxy ring and form a C—O—C ether linkage between phenol and the silicone.

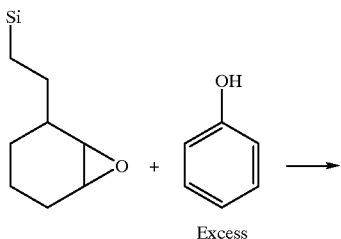

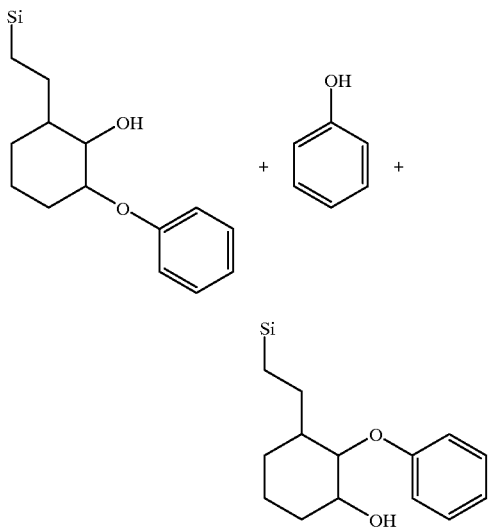

2. Addition of formaldehyde to form a phenolic resin.

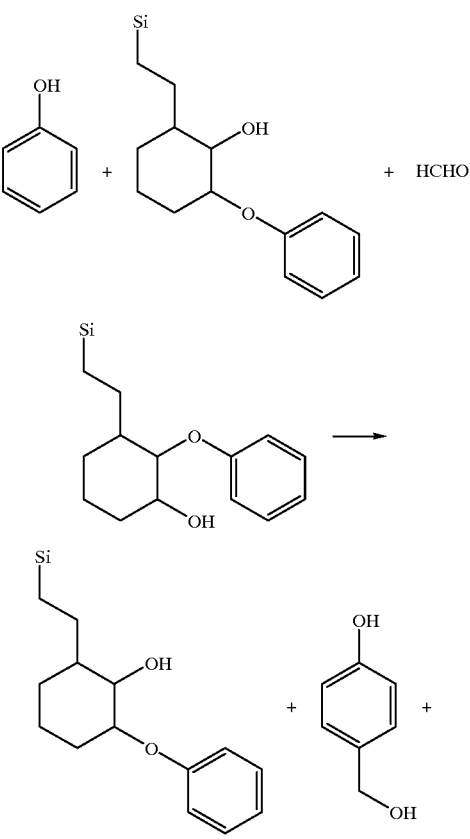

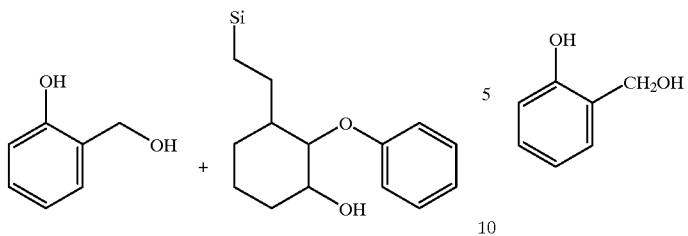

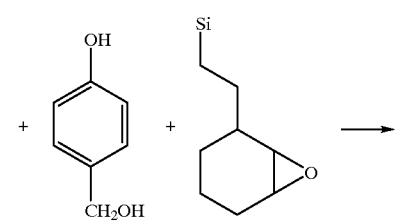

Procedure #2

An epoxy-functional polysiloxane is blended with a phenolic resole. The blend may be used to form composites and then cured with a suitable acid catalyst at low temperatures, or thermally cured with no catalyst at high temperatures.

First, a phenolic resole resin is prepared by reacting phenol and formaldehyde typically in the presence of a basic catalyst, such as sodium hydroxide, at a temperature below about 95° C., preferably between about 45° C. and about 85° C. Then an epoxy-functional polysiloxane is blended into the phenolic resin.

The resulting mixture is added to a suitable substrate to form a composite and then the mixture is cured with an acid catalyst at a low temperature, about 25° C. to about 100° C., or cured without a catalyst at a high temperature, about 100° C. to about 175° C. During the cure, the epoxy-functional polysiloxane is reacted with the phenolic resin as illustrated below.

Generally, the formaldehyde to phenol mole ratio in the phenolic resole resin is about 0.8 to about 3.0, preferably about 1.2 to about 1.9 moles. The basic catalyst to phenol mole ratio in preparing the phenolic resole resin is from about 0.001 to about 0.1 moles of catalyst per mole of phenol, preferably from about 0.005 to about 0.05. The weight range of epoxy-functional polysiloxane added to 100 parts of the phenolic resole is from about 1 to about 100, preferably from about 3 to about 20.

The reaction scheme is illustrated below.

1. Reaction of phenol and formaldehyde to form phenolic resin.

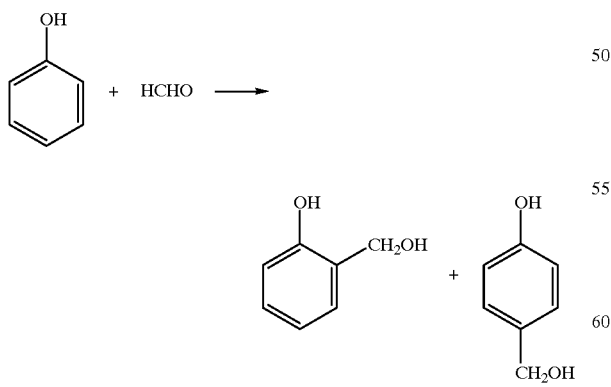

2. Blend of an epoxy-functional polysiloxane into a phenolic resin and then cure with an acid catalyst at low temperature or no acid catalyst at high temperature:

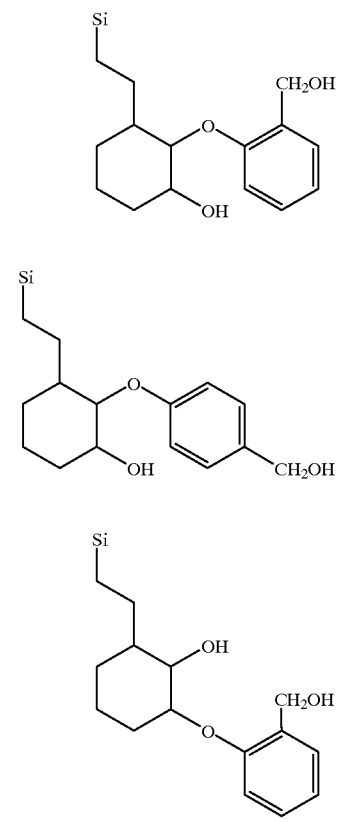

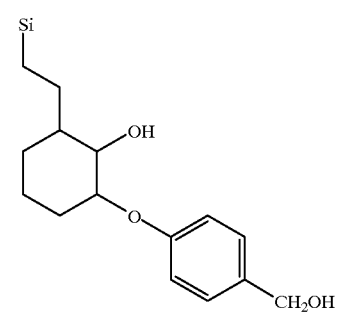

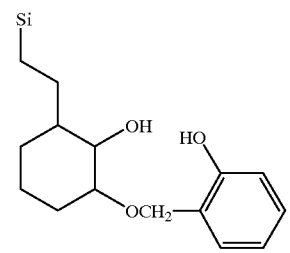

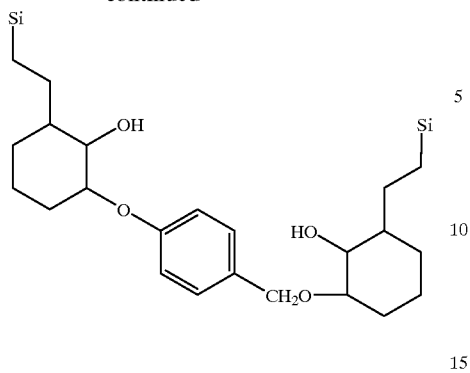

Procedure #3

First a polyhydroxy compound, such as resorcinol, is reacted with an epoxy-functional polysiloxane at a temperature of between about 180° C. and about 250° C. for about 1 to about 7 hours. Then the polyhydroxy-modified epoxy-functional polysiloxane is blended into a phenolic resole. Alternatively, the polyhydroxy-modified epoxy-functional silicone is reacted with formaldehyde, or phenol and formaldehyde, to make a silicone-modified phenolic resole.

Generally, the mole ratio of epoxy-functional polysiloxane to polyhydroxy compound is from 0 to about 10 moles of polyhydroxy compound per mole of epoxy in the silicone, preferably from about 2 to about 3.

The weight range of silicone added to 100 parts of the phenolic resole is from about 1 to about 100, preferably from about 3 to about 20.

The mole ratio of formaldehyde to polyhydroxy compound is from about 0.5 to about 3.0 moles of formaldehyde per mole of resorcinol, preferably about 1.2 to about 1.9.

The weight range of phenol and formaldehyde added to make a silicone-modified phenolic resole is from 0 to about 100 parts of phenol per 1 part of silicone. Formaldehyde is further added in a molar ratio of about 0.9 to about 3.0 moles of formaldehyde per mole of phenol, preferably about 1.2 to about 1.9 moles of formaldehyde per mole of phenol.

1. Reaction of resorcinol with epoxy-functional polysiloxane.

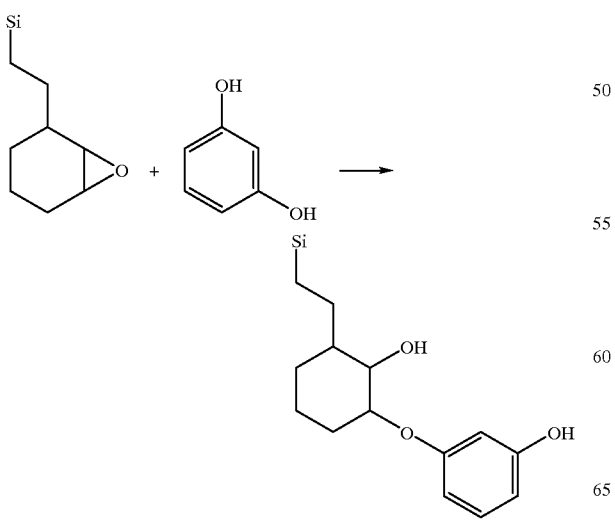

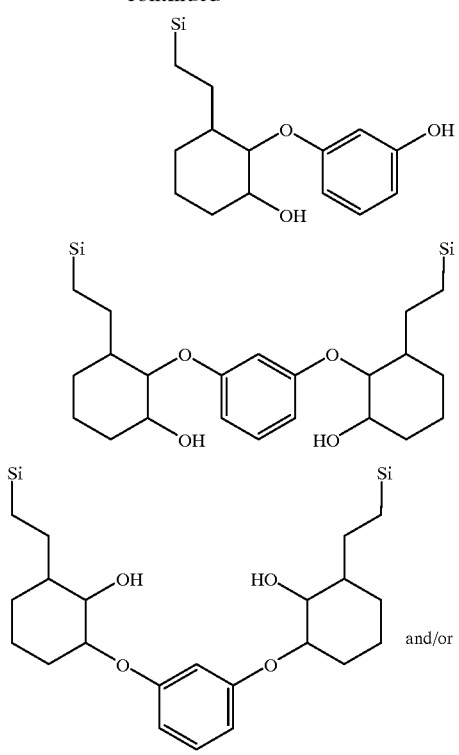

2. Blend with premade resole and then cure with an acid catalyst.

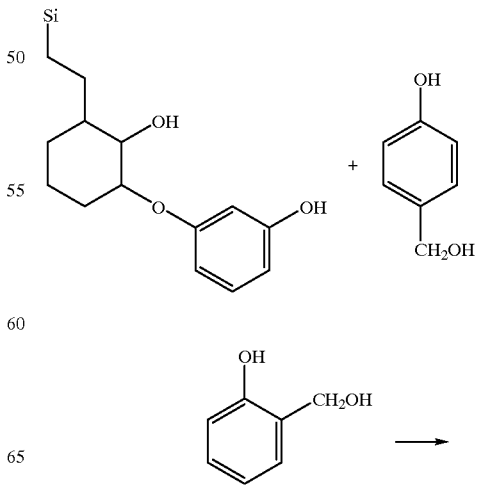

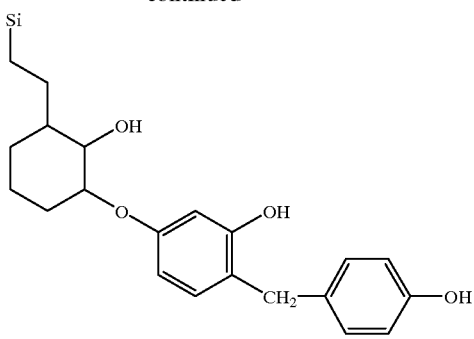

3. Alternatively, further reaction of the resorcinol-modified epoxy-functional polysiloxane with formaldehyde or formaldehyde and phenol.

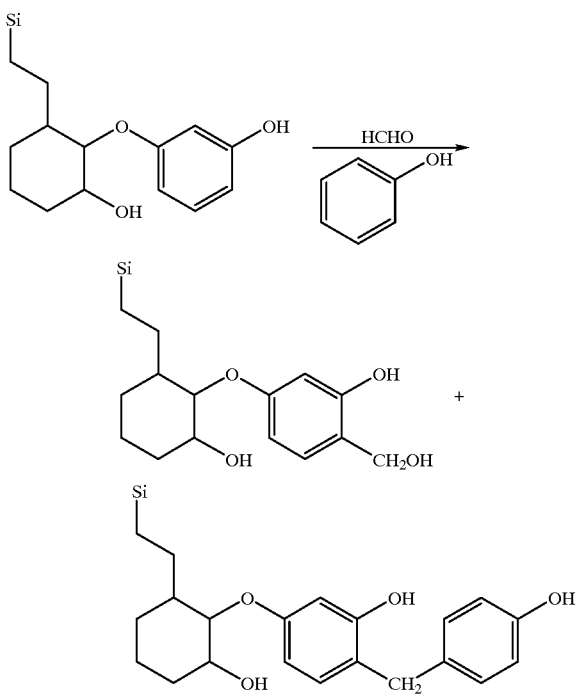

Procedures #1, #2, and #3 include both the prereaction or "grafting" of epoxy-functional polysiloxanes with phenol, alkyl phenols, polyhydroxy phenols such as resorcinol, polyphenol compounds such as bisphenol-A and bisphenol-F, or phenolic resoles, as well as the blending of epoxy-functional polysiloxanes into phenolic resoles, both in the reactor where the phenolic resole is manufactured and in fabricators' tanks prior to manufacture of the composites.

The term phenol is used generically to encompass any suitable phenolic compound.

The present invention is also directed to a mixture of the compositions prepared by procedures #1, #2, and/or #3.

In general, the phenolic resins have a F:P mole ratio of about 0.8 to about 4.0, preferably about 1.0 to about 2.0, and most preferably about 1.6. The phenolic resins are preferably made using a catalyst as known in the art. Suitable catalysts include hydroxides such as sodium hydroxide, or amines such as hexamine. The phenolic resins may be made in situ or premade in a separate reactor for blending with the epoxy-functional polysiloxane. Specific resins are described in the examples.

Suitable epoxy-functional polysiloxanes include OSI Witco Y-12940 and OSI Witco Y-14362. Other epoxy-functional silicones include, but are not limited to, Dow Corning 2-8065, DC Toray Silicones BY 1-2940, ShinEtsu KF-105, ShinEtsu X-22-163A, Shin Etsu X-22-163B, and ShinEtsu X-22-163C.

Regardless of which procedure is used, the resulting epoxy-functional polysiloxane modified phenolic resin may be heat cured or cured in the presence of an acid, either added during the manufacture of the resin as a neutralizing agent, or added externally prior to curing the resin.

The epoxy-functional polysiloxane modified phenolic resins may be heat cured at a temperature above about 90° C., preferably about 100° C. to about 175° C.

The acid catalyst may be any suitable acid catalyst known to those skilled in the art such as mineral and organic acids and their derivatives, such as esters and amides or acid catalysts such as those described in U.S. patent application Ser. No. 08/681,681, hereby incorporated by reference in its entirety. Specific acid catalysts include p-toluenesulfonic acid, esters of phosphoric acid, and hydrochloric acid, sulfuric acid, and their derivatives. Another suitable acid catalyst is described in Table I.

| Acid Catalyst | Weight % |
| --- | --- |
| ethylene glycol | 40.2 |
| pTSA | 23.3 |
| phosphoric acid | 1.8 |
| amino phosphonic acid | 34.7 |

The acid catalyst is added in an amount effective to cure the epoxy-functional polysiloxane modified phenolic resins and the amount depends on the strength of the acid catalyst. For the catalyst listed in Table I, and comparable acid catalysts, the operative range is from 1 to 30 parts by weight of catalyst per 100 parts of resin, and the preferred range is from 5 to 15 parts by weight.

The phenolic component reacts with the epoxy functional group of the silicone to form a C—O—C bond. Some of the advantages of the three procedures include:

(1) formation of a stable chemical linkage between the silicone and the phenolic component;

(2) improved compatibility of the silicone with the phenolic network;

(3) improved reactivity of the phenolic-functionalized silicone with the rest of the phenolic matrix; and (4) improved performance upon exposure to hot-wet conditions.

Another embodiment is directed to uncatalyzed or acid catalyzed compositions with a substrate such as paper, glass, glass cloth, carbon fiber, and aramid substrates such as kevlar or nomex to make a composite material such as a laminate, tube, pipe, honeycomb, or various molded parts by processes such as a filament winding, impregnation (prepregging), pultrusion, dipping, spraying, hand lay-up, sheet molding compound, SCRIMP, or other processes known to those familiar with the composites industry. For example, four-ply glass cloth laminates where prepared using the epoxy-functional polysiloxane modified resole of procedure #2 with 11.5 parts of the acid catalyst described in Table I.

The range for the amount of resin to be added to the substrate in the practice of the invention varies based on the process used. Generally the weight range is from about 1 to about 100 parts of resin per 100 parts of substrate. The preferred weight range again varies from process to process, but it is typically in the range of about 10 to about 50 parts of resin per 100 parts of substrate.

Generally, the reactions and blendings are practiced at atmospheric pressure, but reduced pressures to pressurized vessels may also be used.

EXAMPLES

Example 1

An epoxy-functional polysiloxane-modified phenolic resole was made by procedure #1 above. Eleven parts of epoxy-functional polysiloxane OSI Witco Y-12940 were reacted with 100 parts of phenol in the presence of 0.5 parts of sodium hydroxide at 140° C. for 30 minutes. The reaction was then cooled to 55° C., and the phenol was further reacted with 102 parts of 50% formaldehyde (in a 1.6 mole ratio of formaldehyde/phenol) at 70 to 80° C. for 4 hours to make a polysiloxane-modified phenolic resole resin. The resin was then distilled until a desired water content was achieved.

Example 2

Glass cloth laminates were made from a blend of a phenolic resole and epoxy-functional polysiloxane (OSI Witco Y-12940) as described in procedure #2. A phenolic resole was prepared by mixing 100 parts of phenol with 102 parts of 50% formaldehyde (with a 1.6 mole ratio of formaldehyde/phenol) and 0.013 moles of caustic per mole of phenol as a catalyst and reacting the phenol and formaldehyde until a desired free formaldehyde level is achieved. The water present was partially removed to achieve a specific solids content or water content. Finally, 7 parts of epoxy-functional polysiloxane were added to 100 parts of the resole. This mix can then be used to treat glass fibers or cloth to make a composite that is cured by addition of heat, a catalyst, or both.

Example 3

100 parts of resorcinol were heated to 195° C., and a blend of 2 parts of benzyldimethylamine and 222 parts of epoxy-functional polysiloxane Y-14362 was added over 5 hours while maintaining a temperature of 195° C. The material was then further heated for 2 hours to make a hydrolysis-resistant phenolic-functionalized silicone.

Example 4

A silicone-modified phenolic resole was made by blending the phenolic-functionalized silicone of example 3 with a phenolic resole made in a separate reactor. 100 parts of phenol were mixed with 0.5 parts of sodium hydroxide and 102 parts of 50% formaldehyde at 55° C. The mixture was then reacted at 65° C. to 85° C. until a desired free formaldehyde level was achieved (1%). The mixture was then distilled until a solids content of 65% was achieved, thus completing the preparation of the phenolic resole (Resin 3 in Table II). 100 parts of phenolic resole were then treated with 10 parts of the phenolic-functionalized polysiloxane from example 3 to make a silicone-modified phenolic resole. Similar compositions were prepared with Resins 1 and 2 of Table II.

TABLE II

Phenolic Resole Resin for preparing Blending Mixtures with Epoxy-Functional-Polysiloxane

|  | Resin 1 | Resin 2 | Resin 3 |
| --- | --- | --- | --- |
| formaldehyde/phenol ratio | 1.4 | 1.6 | 1.6 |
| caustic, % | 0.25 | 0.25 | 0.25 |
| free phenol, % | 13–15 | 7–9 | 8–10 |
| free formaldehyde, % | 2.5–3.5 | 2–2.5 | 1.0 max |
| water, % | 3–4 | <10 | 9.5–12.5 |
| solids, % | 76–80 | 76–80 | 71–75 |

Example 5

100 parts of the material described in example 3 were further mixed with 10 parts of HCHO and 2 parts of sodium hydroxide and heated at 45° C. for 24 hours to form a silicone-modified phenolic resin.

Example 6

A composite made with an epoxy-functional silicone-modified resole showed improved performance upon exposure to hot-wet conditions, measured in terms of retention of interlaminar shear strength (ILSS) for a sample soaked in boiling water versus a sample that was not soaked. The data are shown in Table III below. The prior art control in Table III is a methoxy-functional silicone.

TABLE III

Effect of Silicone Type on Interlaminar Shear Strength (ILSS) Retention of a Phenolic Resin-Based Glass Composite

| Silicone Type | Time in Boiling Water (Months) | ILSS Retention vs. No Soak Control (%) |
| --- | --- | --- |
| Methoxy-functional polysiloxane | 1 | 66 |
| Methoxy-functional polysiloxane | 3 | 54 |
| Epoxy-functional polysiloxane | 1 | 87 |
| Epoxy-functional polysiloxane | 3 | 64 |

The data in Table II above show that laminates made with an epoxy-functional polysiloxane-modified resole retained 87% of their interlaminar shear strength after a one month soak, while the prior art control laminates retained only 66% of their strength. Similarly, for laminates soaked for three months, the epoxy-functional polysiloxane-modified resole laminate retained 64% of its ILSS versus 54% for the prior art control.

It will be apparent to those skilled in the art that various modifications and variations can be made in the compositions and methods of the present invention without departing from the spirit or scope of the invention. Thus, it is intended that the present invention cover the modifications and variations of this invention provided they come within the scope of the appended claims and their equivalents.

What is claimed is:

1. A process of preparing a phenolic resin comprising reacting an epoxy-functional polysiloxane with a polyhydroxy phenolic compound at a temperature of between about 180° C. and about 250° C. for 1 to 7 hours to form a polyhydroxyphenolic-functionalized polysiloxane and then blending the polyhydroxyphenolic-functionalized polysiloxane into a phenolic resole to form a polyhydroxyphenolic-functionalized polysiloxane modified phenolic resin.

2. The process according to claim 1 where the polyhydroxy phenolic compound is resorcinol.

3. The process according to claim 1 further comprising reacting the polyhydroxyphenolic-functionalized polysiloxane modified phenolic resin with an acid catalyst.

4. The process according to claim 1 wherein the mole ratio of epoxy-functional polysiloxane to polyhydroxy compound is from greater than 0 to about 10 moles of polyhydroxy compound per mole of epoxy in the polysiloxane.

5. The process according to claim 4 wherein the mole ratio of epoxy-functional polysiloxane to polyhydroxy compound is from about 2 to about 3.

6. The process according to claim 1 wherein from about 1 to about 100 parts by weight of polysiloxane is added to 100 parts of the phenolic resin.

7. The process according to claim 6 wherein from about 3 to about 20 parts by weight of polysiloxane is added to 100 parts of the phenolic resin.

8. A composite comprising a substrate selected from the group consisting of glass, paper, glass cloth, carbon fiber, and aramid substrates and a polyhydroxyphenolic-functionalized polysiloxane modified phenolic resin prepared by reacting an epoxy-functional polysiloxane with a polyhydroxy phenolic compound at a temperature of between about 180° C. and about 250° C. for 1 to 7 hours to form a polyhydroxyphenolic-functionalized polysiloxane and then blending the polyhydroxyphenolic-functionalized polysiloxane into a phenolic resole to form a polyhydroxyphenolic-functionalized polysiloxane modified phenolic resin.

9. The composite according to claim 8 where the polyhydroxy phenolic compound is resorcinol.

10. The composite according to claim 8 further comprising reacting the polyhydroxyphenolic-functionalized polysiloxane modified phenolic resin with an acid catalyst.

11. The composite according to claim 8 wherein the mole ratio of epoxy-functional polysiloxane to polyhydroxy compound is from greater than 0 to about 10 moles of polyhydroxy compound per mole of epoxy in the polysiloxane.

12. The composite according to claim 11 wherein the mole ratio of epoxy-functional polysiloxane to polyhydroxy compound is from about 2 to about 3.

13. The composite according to claim 8 wherein from about 1 to about 100 parts by weight of polysiloxane is added to 100 parts of the phenolic resin.

14. The composite according to claim 11 wherein from about 3 to about 20 parts by weight of polysiloxane is added to 100 parts of the phenolic resin.

* * * * *